US012190768B1

(12) United States Patent
Hsu et al.

(10) Patent No.: US 12,190,768 B1
(45) Date of Patent: Jan. 7, 2025

(54) METHOD FOR AMBIENT LIGHT DETECTION, PROXIMITY SENSING, AND AMBIENT LIGHT CHARGING APPLIED TO DISPLAY PANEL

(71) Applicants: Yi-Jang Hsu, Hsinchu County (TW); Yu-Ting Liu, Hsinchu County (TW); Sheng-De Liu, Hsinchu County (TW)

(72) Inventors: Yi-Jang Hsu, Hsinchu County (TW); Yu-Ting Liu, Hsinchu County (TW); Sheng-De Liu, Hsinchu County (TW)

(73) Assignees: Yi-Jang Hsu, Hsinchu County (TW); Yu-Ting Liu, Hsinchu County (TW); Sheng-De Liu, Hsinchu County (TW)

( * ) Notice: Subject to any disclaimer, the term of this patent is extended or adjusted under 35 U.S.C. 154(b) by 0 days.

(21) Appl. No.: 18/238,493

(22) Filed: Aug. 27, 2023

(51) Int. Cl.
*G09G 3/20* (2006.01)
*G01J 1/42* (2006.01)
*G01S 17/08* (2006.01)
*H02J 7/35* (2006.01)

(52) U.S. Cl.
CPC .............. *G09G 3/20* (2013.01); *G01J 1/4204* (2013.01); *G01S 17/08* (2013.01); *H02J 7/35* (2013.01); *G09G 2320/0626* (2013.01); *G09G 2360/144* (2013.01)

(58) Field of Classification Search
CPC ............. G09G 3/20; G09G 2320/0626; G09G 2360/144; G01J 1/4204; G01S 17/08; H02J 7/35
See application file for complete search history.

(56) References Cited

U.S. PATENT DOCUMENTS

| | | | |
|---|---|---|---|
| 9,869,768 B2 * | 1/2018 | Jeong | G01B 11/24 |
| 10,564,718 B2 * | 2/2020 | Na | G06T 7/514 |
| 10,969,877 B2 * | 4/2021 | Na | G02F 1/13338 |
| 2007/0097358 A1 * | 5/2007 | Oon | G09G 3/3413 356/218 |
| 2010/0141623 A1 * | 6/2010 | Nakanishi | G09G 3/3406 345/207 |
| 2010/0231562 A1 * | 9/2010 | Brown | H01L 27/14609 345/212 |
| 2011/0109605 A1 * | 5/2011 | Omori | G09G 3/3648 345/207 |
| 2011/0273413 A1 * | 11/2011 | Woestenborghs | G09G 3/3611 345/207 |
| 2013/0241891 A1 * | 9/2013 | Usukura | G06F 3/0425 345/175 |
| 2014/0253539 A1 * | 9/2014 | Kline | G09G 3/3233 345/82 |
| 2017/0092187 A1 * | 3/2017 | Bergquist | G09G 3/2092 |
| 2017/0287392 A1 * | 10/2017 | Lynch | G06F 3/0421 |

(Continued)

*Primary Examiner* — William Lu

(57) ABSTRACT

The present invention provides a method for ambient light detection, proximity sensing, and ambient light charging applied to a panel. The method includes: providing a display panel, wherein the display panel comprises a plurality of pixels with PN junctions units in a display area; and providing a driving circuit, wherein the driving circuit drives each display pixel or each PN junction unit through a display mode, a standby mode, and a blanking time, so that part of each display pixel or each PN junction unit is used to perform a display function and part of each display pixel or each PN junction unit is used to carry out the ambient light detection, proximity sensing, or ambient light charging.

12 Claims, 15 Drawing Sheets

(56) References Cited

U.S. PATENT DOCUMENTS

| | | | |
|---|---|---|---|
| 2018/0101035 A1* | 4/2018 | Marotta | G09G 3/3406 |
| 2020/0051499 A1* | 2/2020 | Chung | G09G 5/377 |
| 2020/0258448 A1* | 8/2020 | Hargreaves | G09G 3/3208 |
| 2021/0134855 A1* | 5/2021 | Ghasemi | C12Q 1/6869 |
| 2022/0019757 A1* | 1/2022 | Han | H10K 59/65 |
| 2022/0102583 A1* | 3/2022 | Baumheinrich | G02B 6/12004 |
| 2022/0155144 A1* | 5/2022 | Malinge | H04N 25/77 |
| 2023/0316988 A1* | 10/2023 | Hofrichter | G09G 3/32 |
| | | | 345/55 |
| 2024/0035886 A1* | 2/2024 | Zhang | G06F 3/0416 |

\* cited by examiner

Providing a display panel, Wherein the display panel comprises a plurality of pixels with PN junctions units in a display area —10

Providing a driving circuit, wherein the driving circuit drives each display pixel or each PN junction unit through a display mode, a standby mode, and a blanking time, so that part of each display pixel or each PN junction unit is used to perform a display function, and part of each display pixel or each PN junction unit is used to carry out the ambient light detection, proximity sensing, or ambient light charging. —20

FIG.1

METHOD FOR AMBIENT LIGHT DETECTION, PROXIMITY SENSING, AND AMBIENT LIGHT CHARGING APPLIED TO DISPLAY PANEL

FIELD OF INVENTION

The present invention relates to detection and sensing methods for display panels, and in particular, to a method for ambient light detection, proximity sensing, and ambient light charging applied to a display panel.

BACKGROUND OF INVENTION

Display panels of current technology allow the display function to be switched to other different detection and sensing functions. However, when switching, it is necessary to switch the detection or sensing functions on a whole panel basis. In other words, when a display panel is in a detection mode or a sensing mode, the display panel does not have a display function, causing inconvenience in use.

In view of this, how to provide a method for ambient light detection, proximity sensing, and ambient light charging applied to a display panel, so that an ambient light detection, a proximity sensing, or an ambient light charging function can be performed when the display panel is in the display function is a problem that needs to be solved urgently in this industry.

Technical Solution

In order to solve the above deficiencies of current technology, the main purpose of the present invention is to provide a method for ambient light detection, proximity sensing, and ambient light charging applied to a panel, and to provide a method for ambient light detection, proximity sensing and ambient light charging. The method comprises the following steps: providing a display panel, wherein the display panel comprises a plurality of pixels with PN junctions units; and providing a driving circuit, wherein the driving circuit drives each display pixel or each PN junction unit through a display mode, a standby mode, and a blanking time, so that part of each display pixel or each PN junction unit is used to perform a display function and part of each display pixel or each PN junction unit is used to carry out functions such as the ambient light detection, proximity sensing, or ambient light charging.

In another embodiment, drive switching and arrangement of different functions can be performed for a plurality of sub-systems (such as a first panel, a second panel, a third panel, and a fourth panel, etc.) formed by the display pixels or the PN junction units. Thus, at least one of the sub-systems is used to perform the display function, and the other portions of the sub-systems are used to perform functions such as ambient light detection, proximity sensing, or ambient light charging.

In this way, when the display panel of the present invention is in the display state, it can still perform the ambient light detection, proximity sensing, or ambient light charging function, so that the display panel can have more additional functions to cope with different usage scenarios.

DESCRIPTION OF DRAWINGS

FIG. 1 is a flowchart of a method for ambient light detection, proximity sensing, and ambient light charging applied to a panel of the present invention.

DETAILED DESCRIPTION OF PREFERRED EMBODIMENTS

The present invention, together with the accompanying drawings, is described in detail below in the form of embodiments. The drawings used herein are intended to be illustrative and explanatory only, and are not necessarily true to scale or accurate arrangement of the invention as implemented. Therefore, the scale and arrangement of the attached drawings should not be used to limit the scope of patentability of the invention in actual practice.

Figure 2:
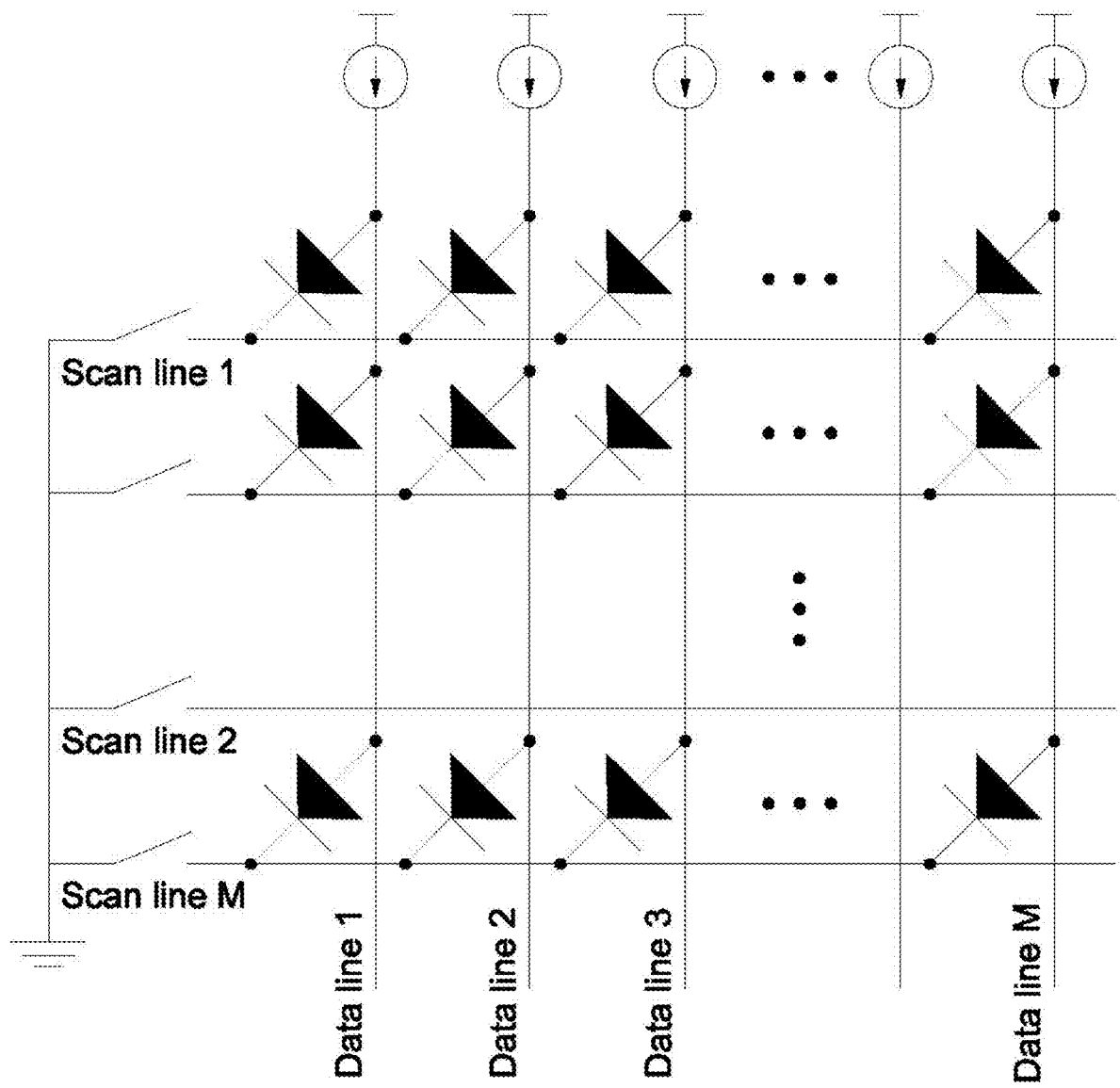
FIG. 2 is a schematic view of the method for ambient light detection, proximity sensing, and ambient light charging applied to the panel of the present invention, which is applied to a circuit of a passive matrix.

Please refer to FIGS. 1 and 2, a method for ambient light detection, proximity sensing, and ambient light charging applied to a panel comprises the following steps:

Step 10: Providing a display panel 100, wherein the display panel 100 comprises a plurality of pixels with PN junctions units in a display area; and Step 20: Providing a driving circuit 200, wherein the driving circuit 200 drives each display pixel or each PN junction unit through a display mode, a standby mode, and a blanking time, so that part of each display pixel or each PN junction unit is used to perform a display function, and part of each display pixel or each PN junction unit is used to carry out the ambient light detection, proximity sensing, or ambient light charging.

Figure 3:
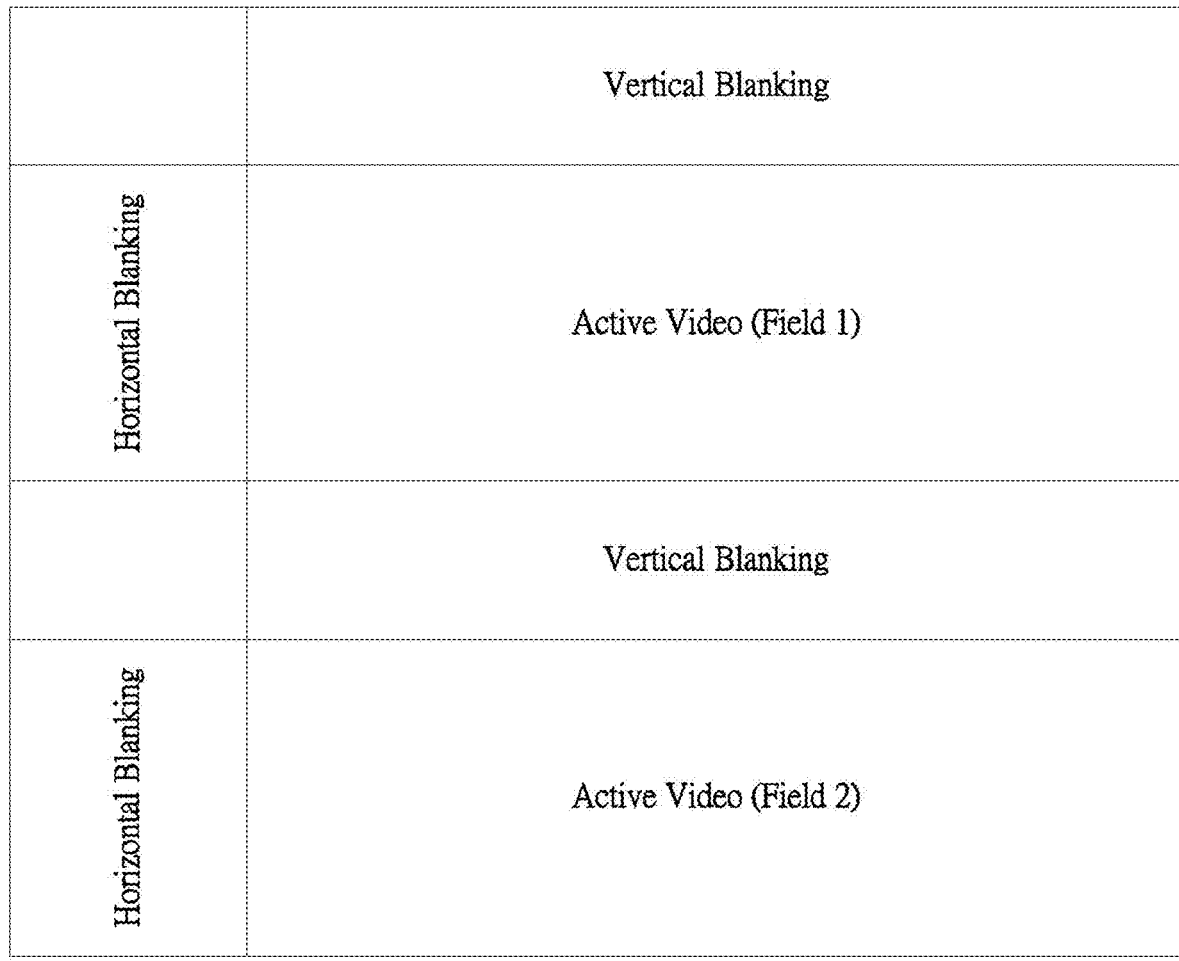
FIG. 3 is a schematic view of a horizontal blanking time and a vertical blanking time for a blanking time in the method for ambient light detection, proximity sensing, and ambient light charging applied to the panel of the present invention.

In detail, the method of the present invention is not limited by the form of driving of the display panel to realize. Take the current-driven LED light-emitting driving circuit in the passive matrix in FIG. 2 as an example, in the case where the driving circuit 200 is already energized, it will be divided into a display mode (the display panel is illuminated), a standby mode (the display panel is not displayed), and a blanking time B. As shown in FIG. 3, the blanking time B of the driving circuit 200 may further comprise a horizontal blanking time BH and a vertical blanking time BV. In this way, operation cycles such as ambient light detection, proximity sensing, or ambient light charging can be inserted into the horizontal blanking time BH and vertical blanking time BV.

The functions of the present invention, such as display, ambient light detection, proximity sensing or ambient light charging, are described below:

Display: Use the display panel 100 to display data, web pages, and images.

Ambient light detection: Ambient light detection is realized by utilizing the display gap or unused part of display pixels of the display panel 100. Ambient light detection can be achieved through circuit technology and system switching modes (e.g. photovoltaic mode, photoconductive mode). In addition, information quantifying the intensity of the ambient light may be fed back to a control unit of the display panel 100 so that it may optimize the brightness of the display panel 100 depending on the intensity of the ambient light (e.g., increase the brightness of the display panel 100 when the ambient light is too strong, or decrease the brightness of the display panel when the ambient light is weak). The implementation of ambient light detection includes capturing quantitative information about ambient light intensity through a whole area, sub-regions, sub-pixels or color units (e.g., R, G, B LEDs) manner, and then feeding it back to the control unit of the display panel 100 for ambient light analysis and brightness optimization of the display panel 100.

Proximity sensing: Proximity sensing is realized by utilizing a portion of display pixels of the display panel 100 and an unused portion of the display pixels. Proximity sensing can be achieved through circuit technology and system switching modes. Proximity sensing can also be combined with additional infrared LED (VCEL) lighting control to enhance the performance of proximity sensing, the additional infrared LED (VCEL) lighting control, or other mechanisms to realize the effects of ToF (Time of Flight) and 3D Sensing.

Ambient light charging: ambient light charging is achieved by utilizing the display gaps or unused portions of the display pixels of the display panel 100. Ambient light charging is achieved through circuit technology and system switching modes (i.e., photovoltaic mode). The implementation of ambient light charging includes absorbing ambient light energy through a whole area, sub-regions, sub-pixels or color units manner, thereby realizing the function of ambient light charging.

The above four functions (display, ambient light detection, proximity sensing, and ambient light charging) can be integrated with other detection modes (e.g., touch-control mode) for circuit or system integration, to create a wider variety of panel functions to produce corresponding effects.

Figure 4:
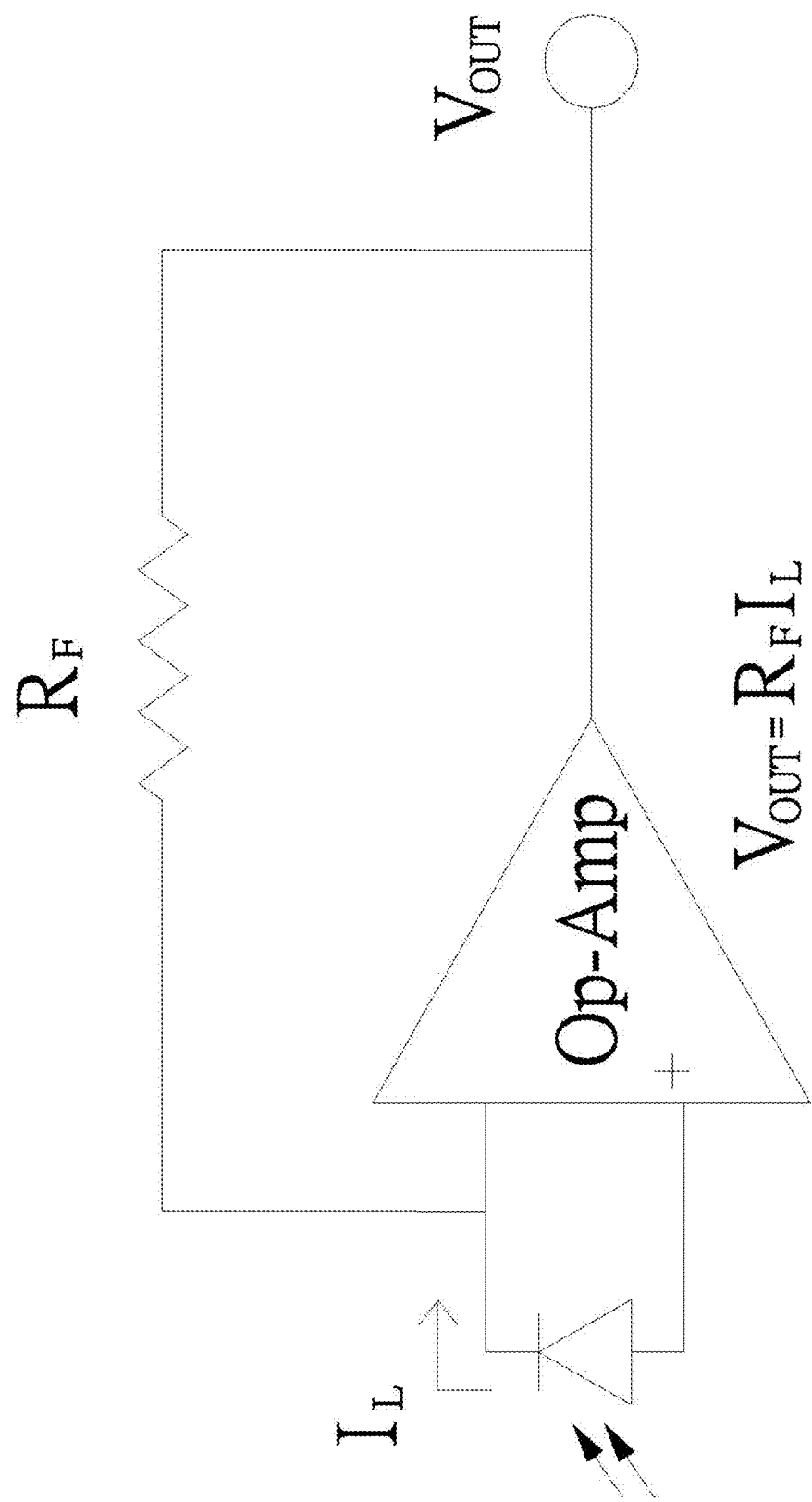
FIG. 4 is a schematic view of photovoltaic modes used for ambient light detection and ambient light charging in the method of ambient light detection, proximity sensing, and ambient light charging applied to the panel of the present invention.

It should be noted that the photovoltaic mode used for ambient light detection and ambient light charging is the photovoltaic mode distinguished from the light sensing mode of the semiconductor diode. The current generated by the photovoltaic effect by applying the photovoltaic mode can be used for rechargeable batteries or energy storage, which can be referred to the schematic view of the photovoltaic mode shown in FIG. 4.

Figure 5:
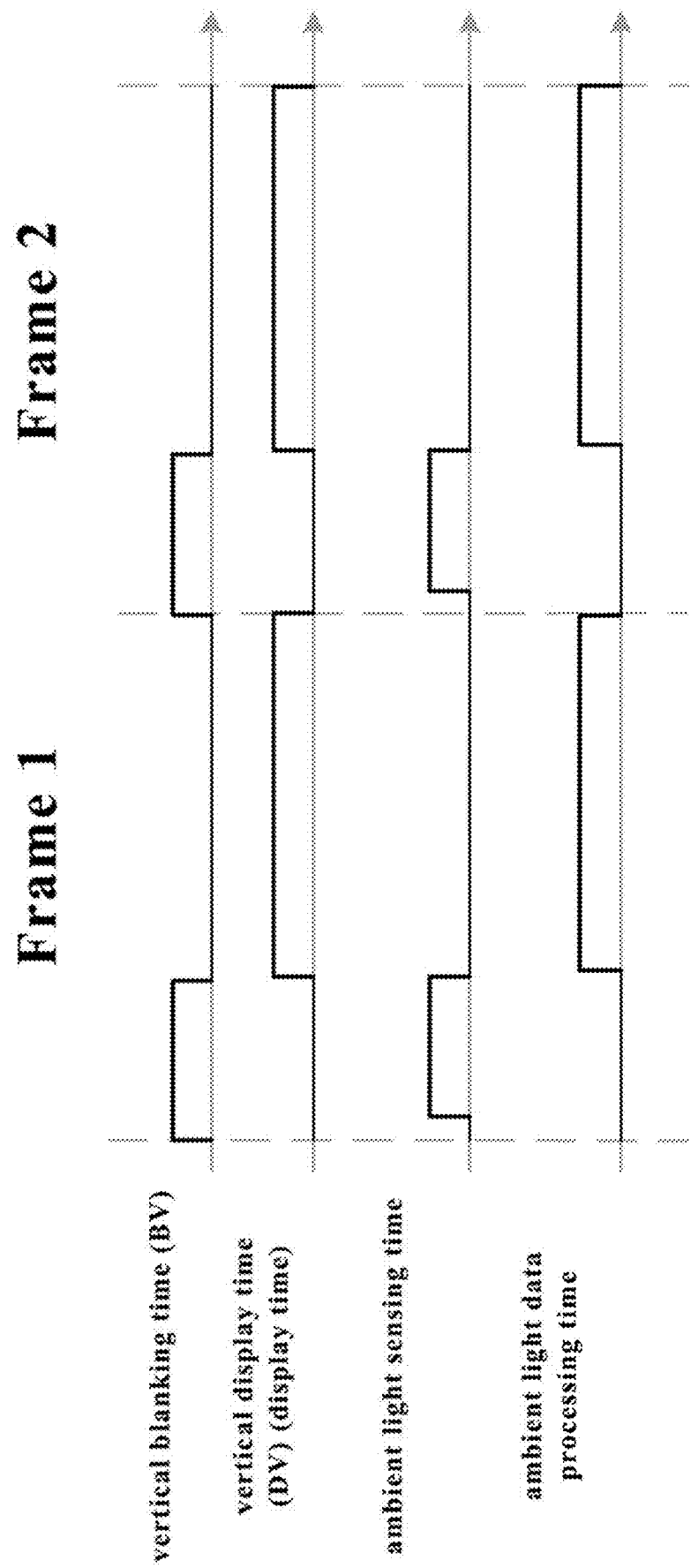
FIG. 5 is a schematic view of the method for ambient light detection, proximity sensing, and ambient light charging applied to the panel of the present invention, in which ambient light detection is performed using a vertical blanking time, and collected ambient light data is processed using a vertical display time.

In the method for ambient light detection, proximity sensing, and ambient light charging applied to the panel of the present invention, the time slot when the display panel 100 is not displaying is utilized for the switching of other functions, and there is no specific display cycle for the switching of the functions, so that it can be arbitrarily designed in accordance with the needs of different uses. Embodiments of implementation are described below:

First, as shown in FIG. 5, in a first embodiment, the vertical blanking time BV has a corresponding vertical display time DV. The vertical blanking time BV is used for ambient light detection and the vertical display time DV is used to process collected ambient light data.

Figure 6:
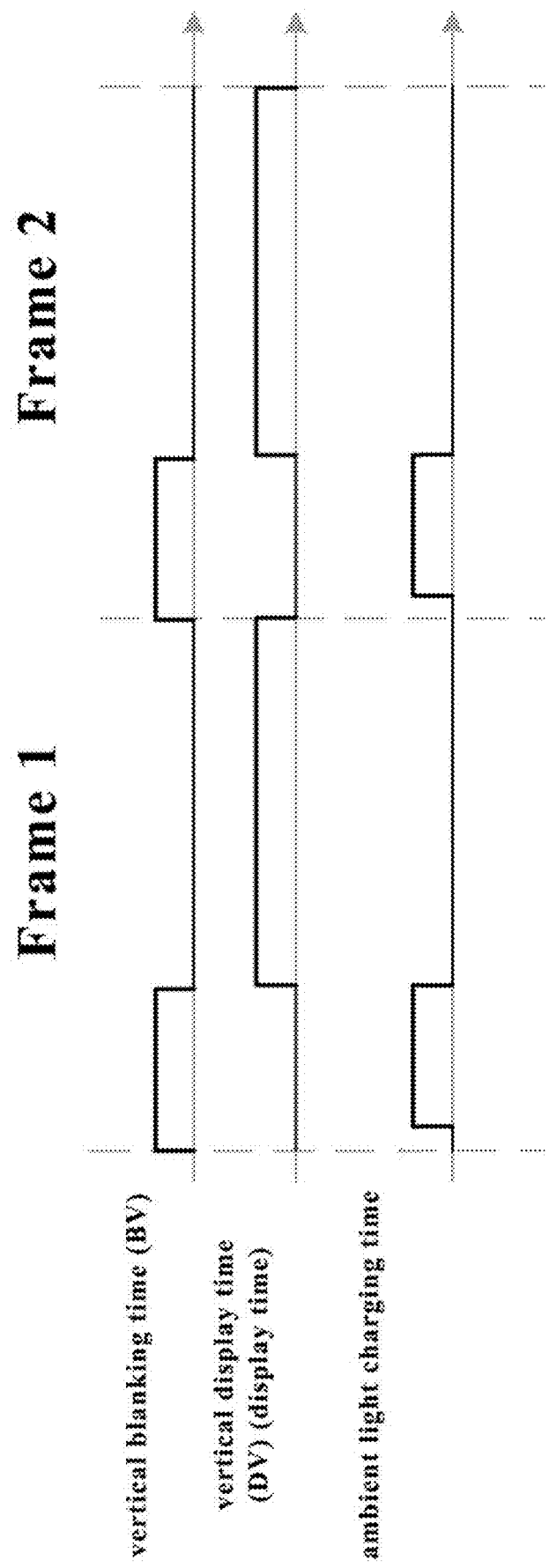
FIG. 6 is a schematic view of the method for ambient light detection, proximity sensing, and ambient light charging applied to the panel of the present invention, in which a vertical blanking time is utilized to implement ambient light charging.

As shown in FIG. 6, in a second embodiment, a vertical blanking time BV is used for ambient light charging.

Figure 7:
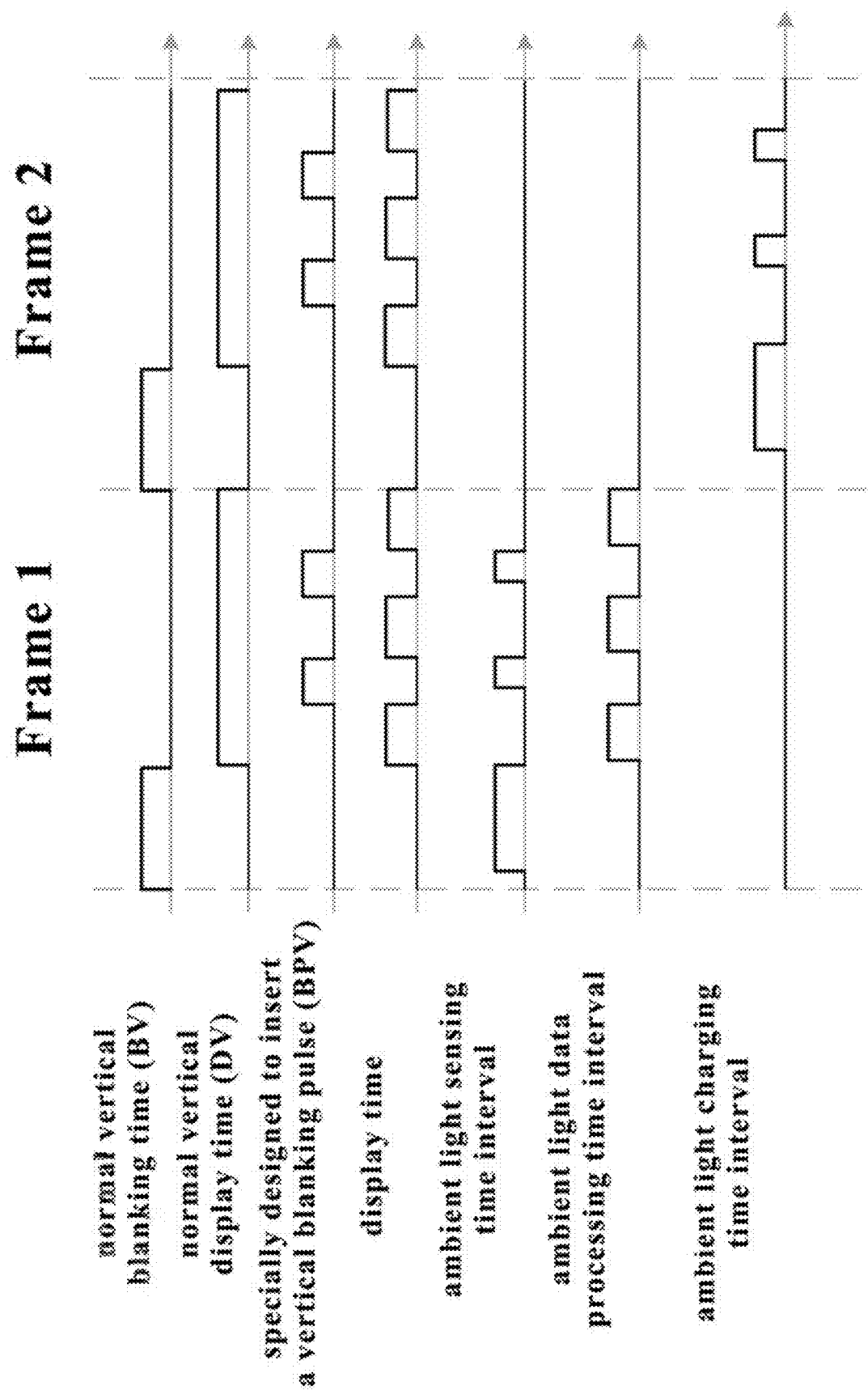
FIG. 7 is a schematic view of the method for ambient light detection, proximity sensing, and ambient light charging applied to the panel of the present invention, in which a vertical blanking pulse time without display is inserted to the vertical display time for the ambient light detection or ambient light charging.

As shown in FIG. 7, in a third embodiment, the vertical blanking time BV has a corresponding vertical display time DV, so that a vertical blanking pulse time BPV, which is not displayed, may be inserted in the vertical display time DV for ambient light detection or ambient light charging.

Figure 8:
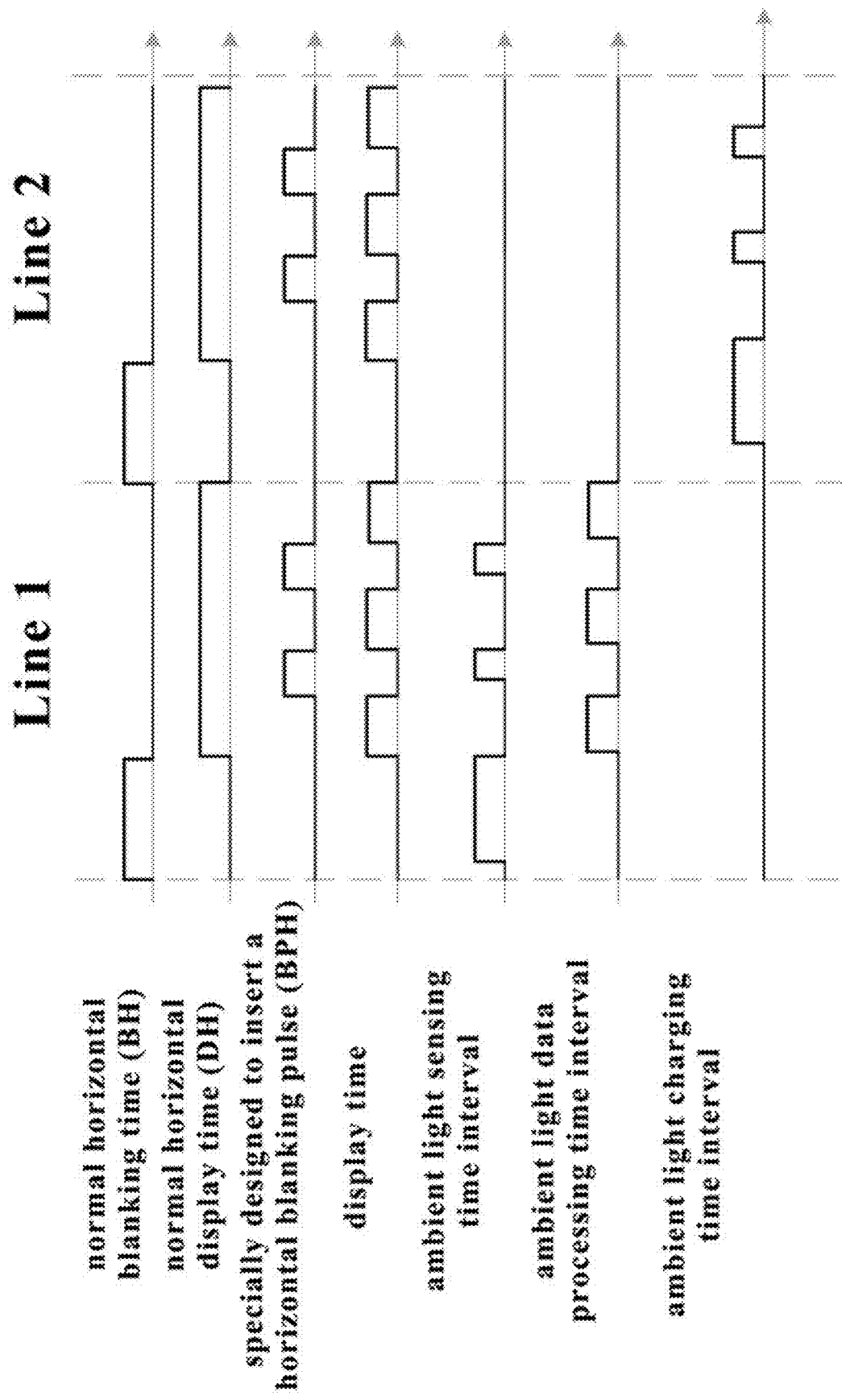
FIG. 8 is a schematic view of the method for ambient light detection, proximity sensing, and ambient light charging applied to the panel of the present invention, in which a blanking pulse time without display is inserted to a horizontal blanking time or a horizontal display cycle.

As shown in FIG. 8, in a fourth embodiment, the horizontal blanking time BH can be made to have a corresponding horizontal display time DH, and a horizontal blanking pulse time BPH, which is not to be displayed, can be inserted into the horizontal display time DH to carry out a switching effect of functions such as ambient light detection or ambient light charging, etc., as referred to in the above first, second, and third embodiments.

Furthermore, functions such as ambient light detection, ambient light charging, and the like can be implemented using the standby time when the display panel 100 is not displayed at all.

In the method for ambient light detection, proximity sensing, and ambient light charging applied to the panel of the present invention, unlike the above embodiments, the display pixels of the display panel 100 may be further utilized for display function, and the undisplayed pixels (or dots), which may be some of the undisplayed pixels or all of the undisplayed pixels, may be switched to functions such as ambient light detection, proximity sensing, or ambient light charging.

That is, in one embodiment, the display function may be carried out using the display pixels of one single display panel 100, and the functions of ambient light detection, proximity sensing, or ambient light charging may be switched by some of the undisplayed pixels or all of the undisplayed pixels of the single display panel 100. In other words, the single panel 100 can achieve the required switching function.

Figure 9:
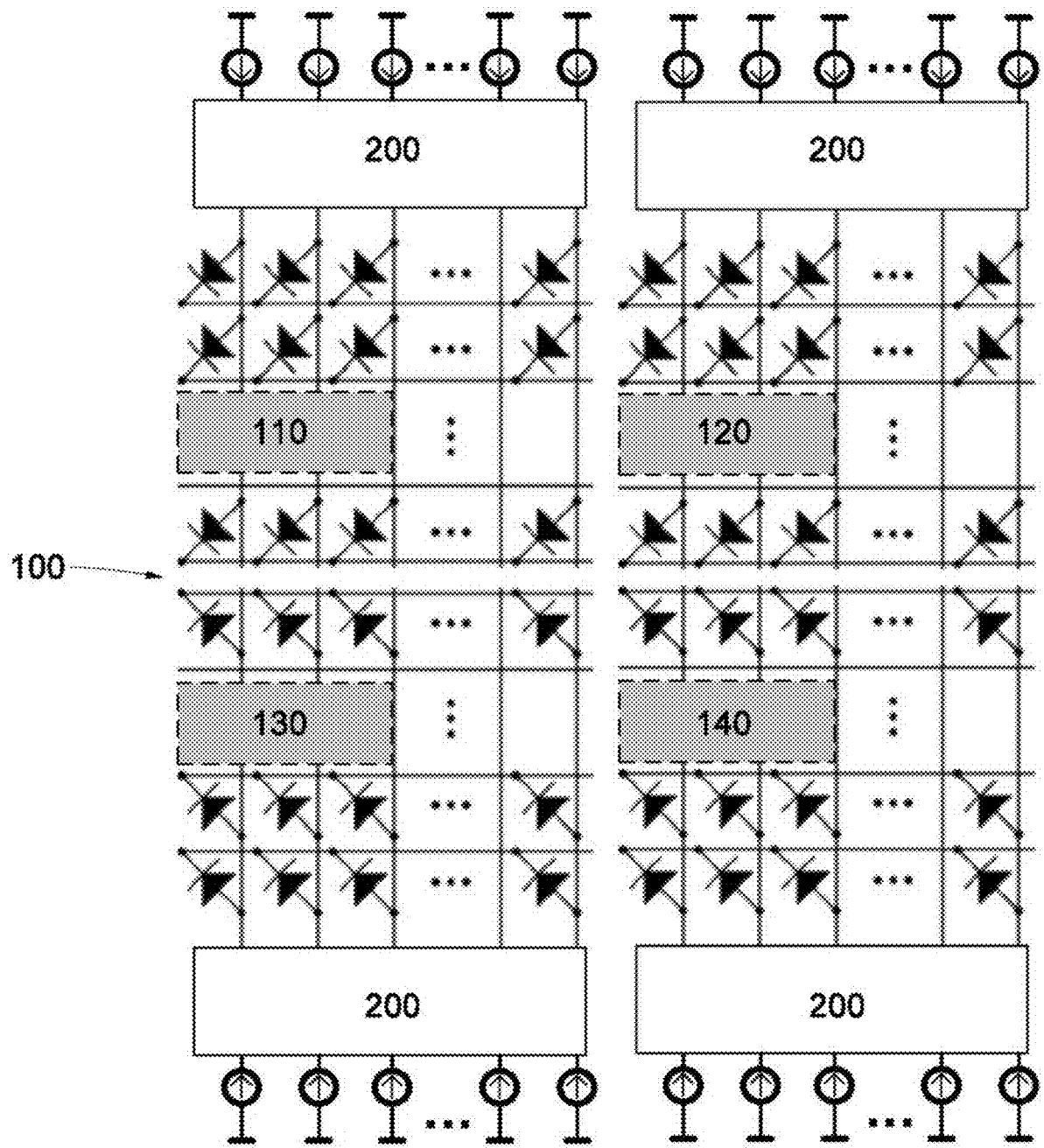
FIG. 9 is a schematic view of the method for ambient light detection, proximity sensing, and ambient light charging applied to the panel of the present invention, in which the display panel comprises separate zones.

The above switching function has other embodiments. Take the current-driven LED light-emitting driving circuit in the passive matrix in FIG. 9 as an example. In other embodiment, the display panel 100 has an independently partitioned mode switching architecture. In other words, the display pixels and the PN junction units of the display panel 100 may be formed into a plurality of sub-systems, each sub-system having a first sub-panel 110, a second sub-panel 120, a third panel sub-130, and a fourth panel 140, and the first sub-panel 110, the second sub-panel 120, the third sub-panel 130, and the fourth sub-panel 140 may carry out either two or three of the functions of displaying, ambient light detection, proximity sensing, or ambient light charging, etc., during a display time interval.

For example, in this mode of panel design, since the first sub-panel 110, the second sub-panel 120, the third sub-panel 130, and the fourth sub-panel 140 have been independently separated, the cooperating driving circuit 200 allows each of the first sub-panel 110, the second sub-panel 120, the third sub-panel 130, and the fourth sub-panel 140 to independently select the desired function mode. For example, at a certain display time interval, the first sub-panel 110 and the fourth sub-panel 140 select the display mode, the second sub-panel 120 selects the ambient light detection or proximity sensing (photoconductive or photovoltaic) mode, and the third sub-panel 130 selects the ambient light charging (photovoltaic) mode. And in the next display time interval, the second sub-panel 120 and the third sub-panel 130 can be made to select the display mode, the first sub-panel 110 selects the ambient light detection or proximity sensing (photoconductive or photovoltaic) mode, and the fourth sub-panel 140 selects the ambient light charging (photovoltaic) mode.

The above applications can also be combined with other panel designs or other driving methods. For example, with driving methods of an active matrix, some or all of the display pixels without display function can be switched to realize the function of ambient light detection, proximity sensing, or ambient light charging.

The combination of the above sub-system is not limited to four sub-panels. That is, it may be less than four sub-panels, i.e., two or three sub-panels; or it may comprise five or more sub-panels.

Figure 10:
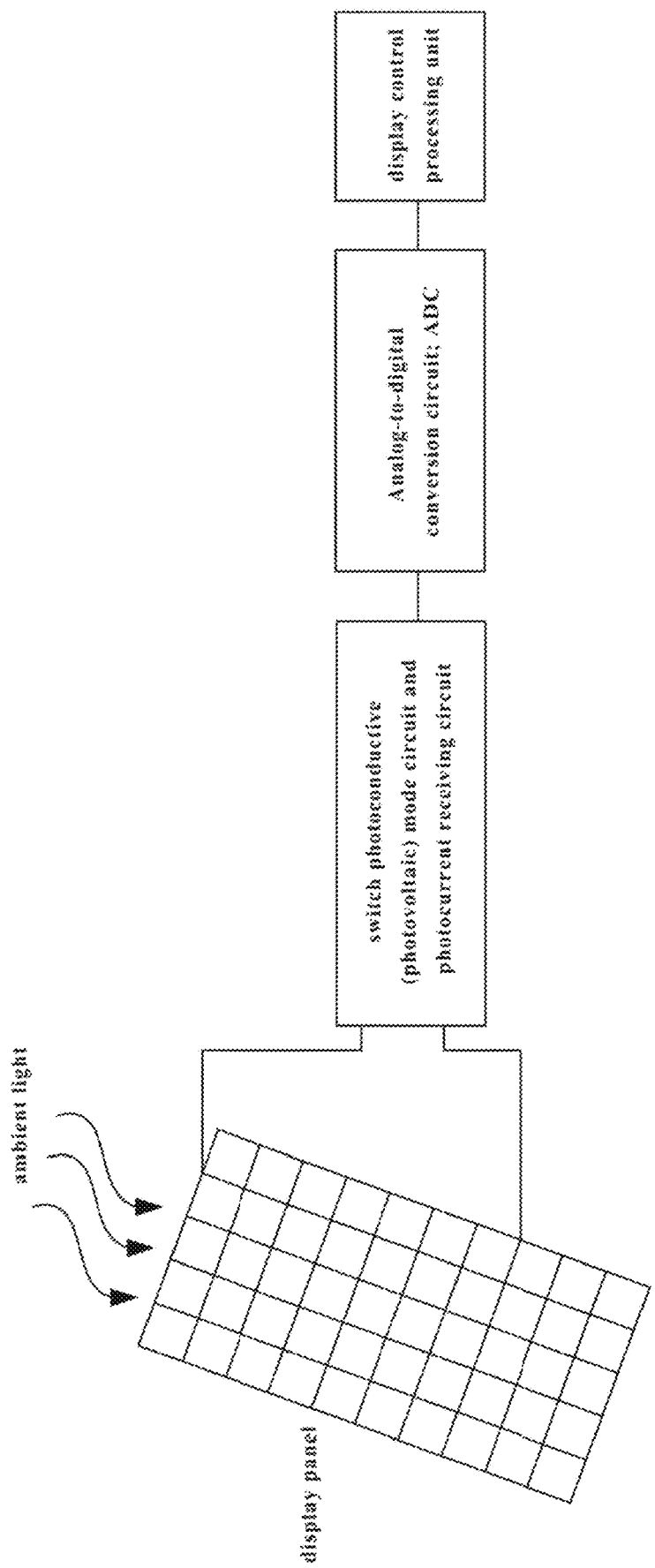
FIG. 10 is a schematic view of system architecture of the function of ambient light detection in the method of ambient light detection, proximity sensing, and ambient light charging applied to the panel of the present invention.

As shown in FIG. 10, this is an embodiment of a system architecture for ambient light detection as described above.

Figure 11:
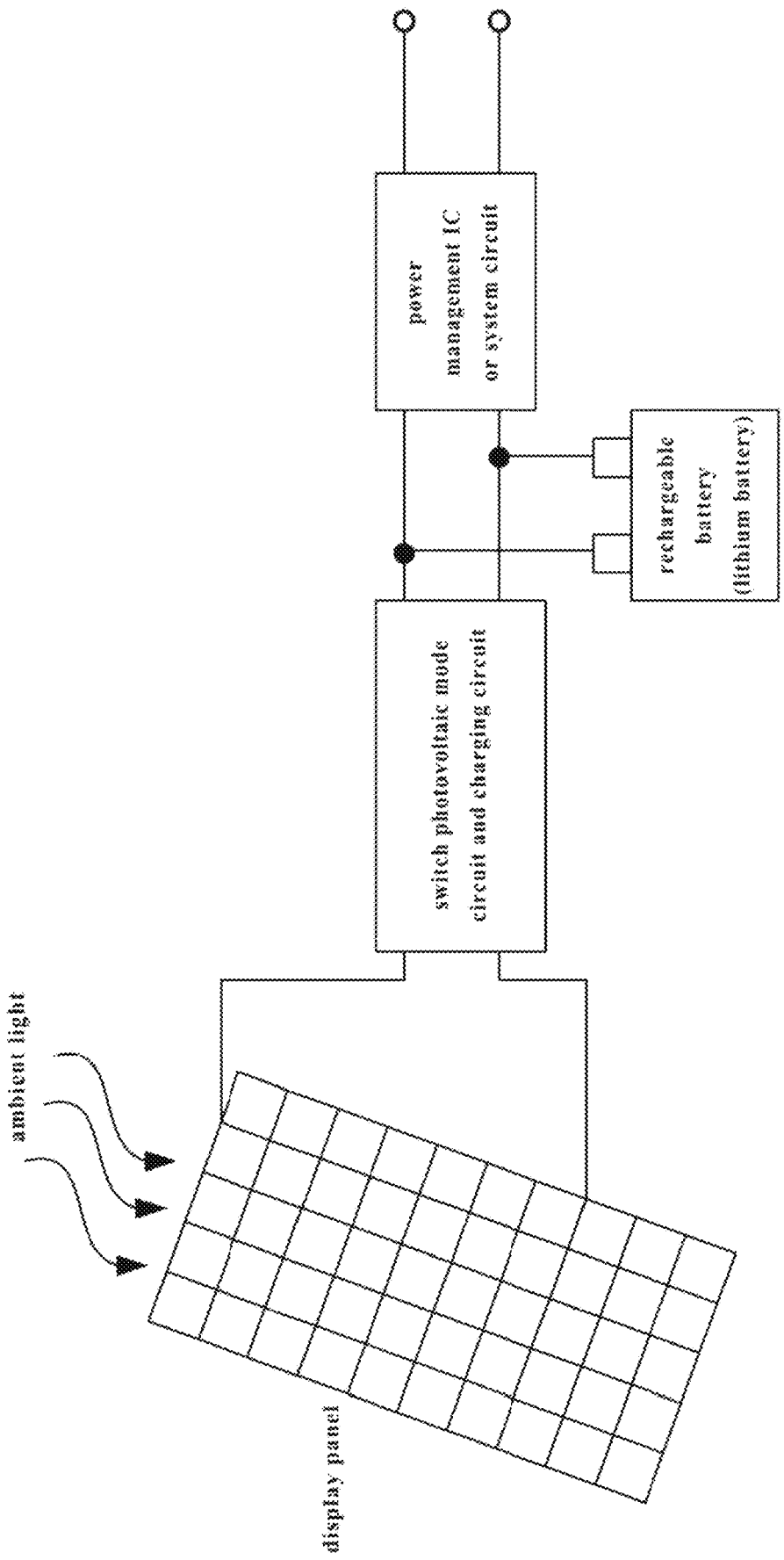
FIG. 11 is a schematic view of system architecture of the function of ambient light charging in the method of ambient light detection, proximity sensing, and ambient light charging applied to the panel of the present invention.

As shown in FIG. 11, this is an embodiment of a system architecture for ambient light charging as described above.

Figure 12:
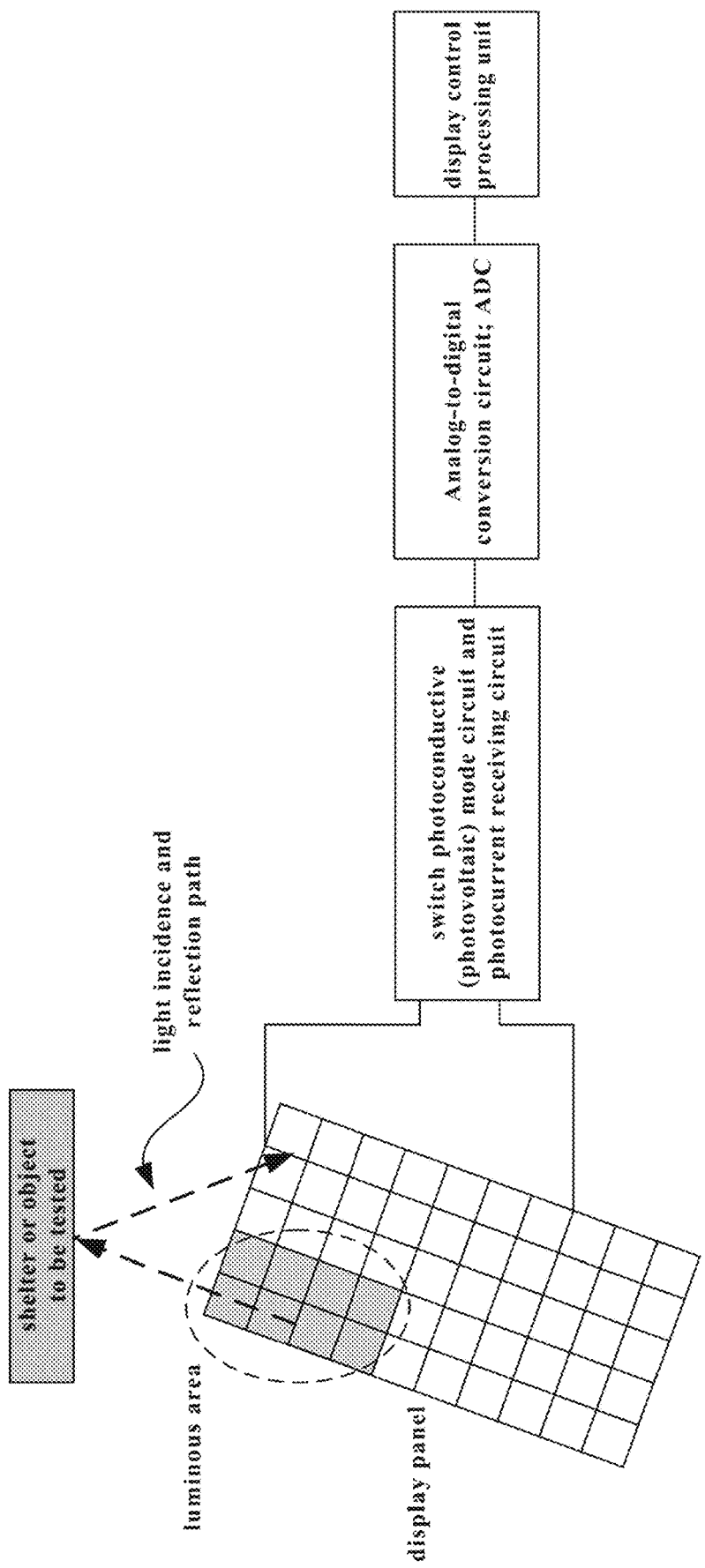
FIG. 12 is a schematic view of system architecture of the function of proximity sensing in the method of ambient light detection, proximity sensing, and ambient light charging applied to the panel of the present invention.

As shown in FIG. 12, this is an embodiment of a system architecture for proximity sensing as described above.

In the above embodiment, the system architecture with proximity sensing can be combined with additional infrared LED lighting control to enhance the sensing performance or to realize the effects of ToF (Time of Flight) and 3D Sensing.

The method for ambient light detection, proximity sensing, and ambient light charging applied to the panel of the present invention can be further utilized in the following applications:

I. Integrate the Effect of Charging, Storing, and Displaying of Solar Cells in Conjunction with the Present Invention.

The present invention can electrically connect any type of solar cell (including a completely transparent solar cell) by laminating, embedding, etc., in a main body of the display panel 100. This allows each PN junction units of the display panel 100 to simultaneously perform the functions of charging, storing power, and displaying.

II. Proximity Sensing Applications

Figure 13:
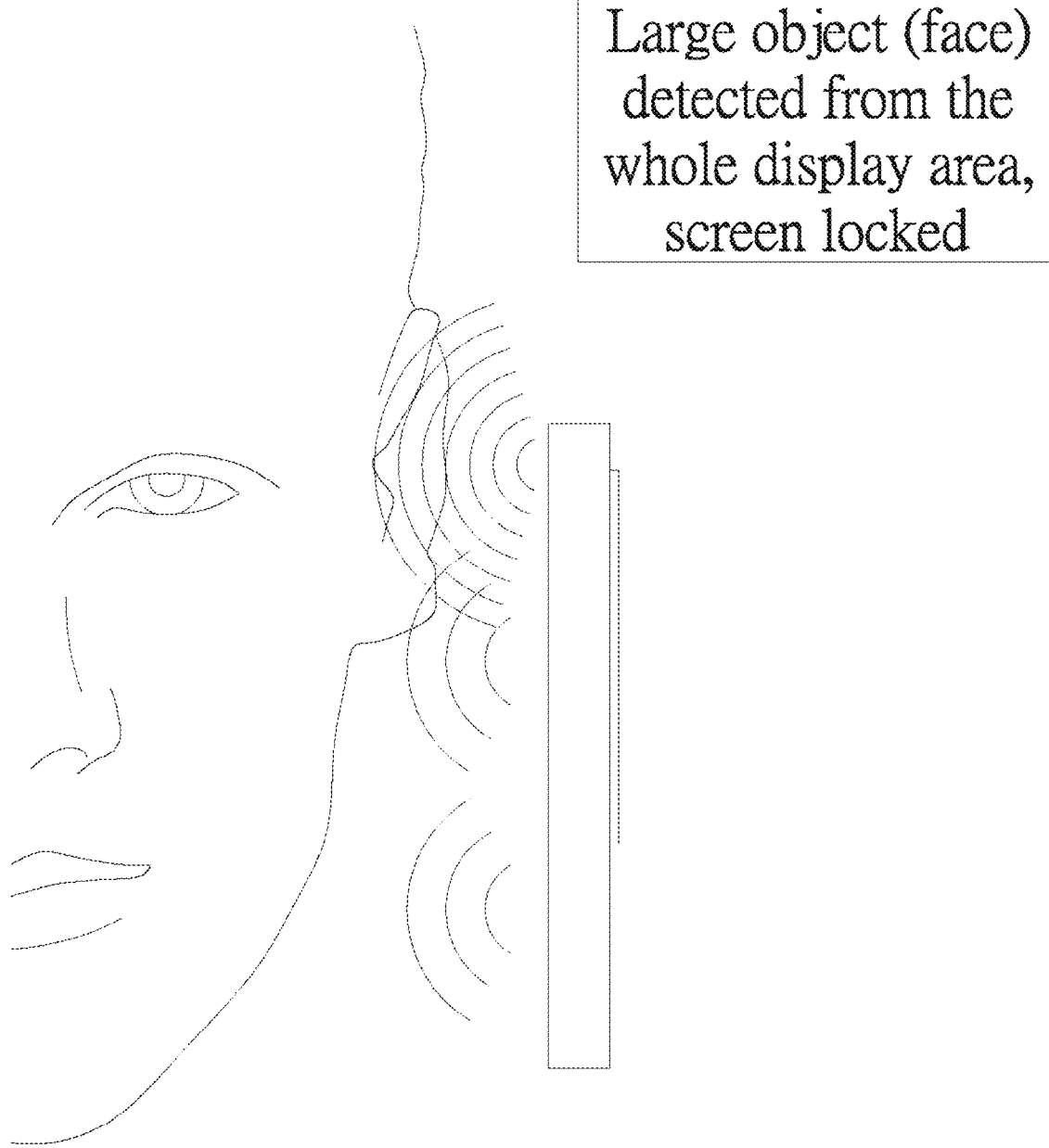
FIG. 13 is a schematic view of proximity sensing application of the method for ambient light detection, proximity sensing, and ambient light charging applied to the panel of the present invention.

As shown in FIG. 13, the present invention can realize the application of proximity sensing through the function of proximity sensing. For example, the distance of the display panel 100 relative to an object (e.g., a person's face) may be detected to switch the function of the PN junction units.

III. ToF Application

Figure 14:
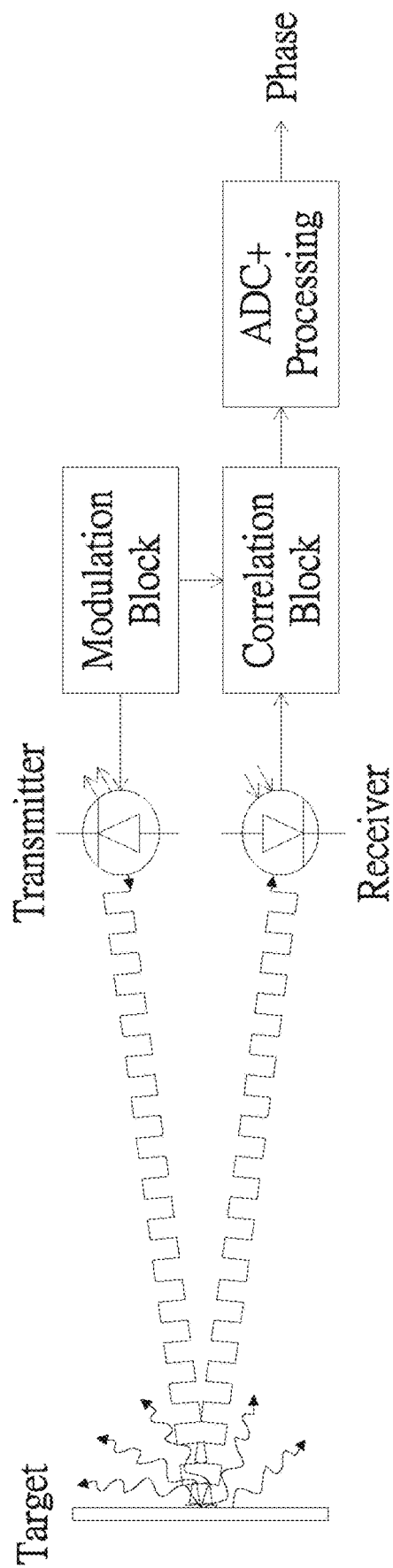
FIG. 14 is a schematic view of ToF application of the method for ambient light detection, proximity sensing, and ambient light charging applied to the panel of the present invention.

As shown in FIG. 14, the present invention can realize ToF (Time of Flight) application through proximity sensing function, and thus has the range scanning modeling effect similar to Lidar.

IV. 3D Sensing Application

Figure 15:
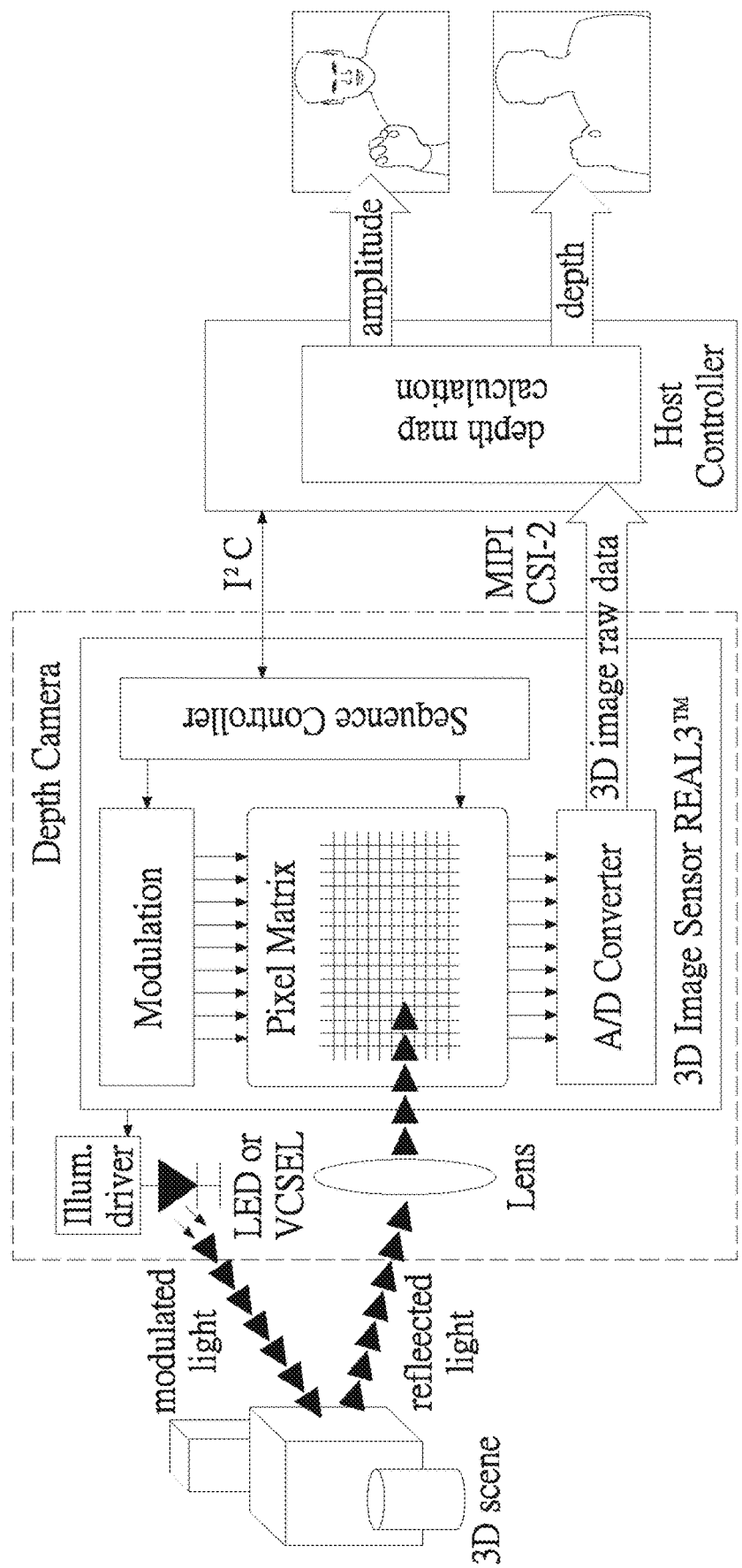
FIG. 15 is a schematic view of 3D sensing application of the method for ambient light detection, proximity sensing, and ambient light charging applied to the panel of the present invention.

As shown in FIG. 15, the present invention can realize 3D sensing application through the function of proximity sensing. In other words, through the structured light source imaging method, a structured mode is used to project homogeneous infrared light onto an object and decode the reflected light to construct a 3D image. This will enhance the camera's ability to recognize faces and objects in a wide range of applications such as augmented reality, gaming, and unmanned driving.

In summary, the present invention can perform different functions of drive switching and arrangements, using the temporary storage time of human eyes, for each display pixel or each PN junction units by means of different circuit designs and mode switching designs, or perform different functions of drive switching and arrangements for the sub-systems (e.g., the first panel, the second panel, the third panel, and the fourth panel, etc.) formed by the display pixels or the PN junction units. In this way, at the same time, it will be possible to enable display functions in some areas of the display panel and functions such as ambient light detection, proximity sensing, or charging with ambient light in other areas of the display panel. In other words, the display panel can simultaneously perform functions such as display, ambient light detection, proximity sensing, or ambient light charging at the same time so that all areas of the display panel can be effectively utilized, and efficient conversion can be realized.

The above embodiments are only intended to illustrate the technical ideas and features of the present invention, and are intended to enable persons skilled in the art to understand the content of the present invention and to implement it accordingly, and should not be used to limit the scope of the patent of the present invention. That is, all equal variations or modifications made in the spirit of the invention shall be covered by the claims of the present invention.

REFERENCE NUMERALS 10, 20: steps
100: display panel
110: first sub-panel
120: second sub-panel
130: third sub-panel
140: fourth sub-panel
200: driving circuit
B: blanking time
BH: Horizontal blanking time
BV: vertical blanking time
DH: horizontal display time DV: vertical display time
BPH: horizontal blanking pulse time
BPV: vertical blanking pulse time

What is claimed is:

1. A method for ambient light detection, proximity sensing, and ambient light charging applied to a panel, comprising the following steps:
   providing a display panel, wherein the display panel comprises a plurality of pixels with PN junctions units in a display area; and
   providing a driving circuit, wherein the driving circuit drives each display pixel or each PN junction unit through a display mode, a standby mode, and a blanking time, so that part of each display pixel or each PN junction unit is used to perform a display function and part of each display pixel or each PN junction unit is used to carry out the ambient light detection, proximity sensing, or ambient light charging;
   wherein the display function is carried out by using the display pixels of the display panel, and the functions of ambient light detection, proximity sensing, or ambient light charging may be switched by some of undisplayed pixels or all of the undisplayed pixels of the display panel, wherein the blanking time of the driving circuit comprises a horizontal blanking time and a vertical blanking time, the vertical blanking time has a corresponding vertical display time, a vertical blanking pulse time without display is inserted to the vertical display time for the ambient light detection or ambient light charging, and the horizontal blanking time has a corresponding horizontal display time, and a horizontal blanking pulse time without display is inserted to the horizontal display time for the ambient light detection or ambient light charging.

2. The method for ambient light detection, proximity sensing, and ambient light charging applied to the panel according claim 1, wherein the vertical blanking time is used for the ambient light detection, and the vertical display time is used for processing collected ambient light data.

3. The method for ambient light detection, proximity sensing, and ambient light charging applied to the panel according claim 1, wherein the vertical blanking time is used for the ambient light charging.

4. The method for ambient light detection, proximity sensing, and ambient light charging applied to the panel according claim 1, wherein the horizontal blanking time is used for the ambient light detection, and the horizontal display time is used for processing collected ambient light data.

5. The method for ambient light detection, proximity sensing, and ambient light charging applied to the panel according claim 1, wherein the horizontal blanking time is used for the ambient light charging.

6. The method for ambient light detection, proximity sensing, and ambient light charging applied to the panel according claim 1, wherein the display pixels and the PN junction units form a plurality of sub-systems, and each sub-system is capable of carrying out either two or three of the display function, the ambient light detection, the proximity sensing, or the ambient light charging, during a display time interval.

7. The method for ambient light detection, proximity sensing, and ambient light charging applied to the panel according claim 6, wherein each sub-system has a first subpanel, a second sub-panel, a third sub-panel, and a fourth sub-panel, and the first sub-panel, the second sub-panel, the third sub-panel, and the fourth sub-panel are capable of carrying out either two or three of the display function, the ambient light detection, the proximity sensing, or the ambient light charging, during a display time interval.

8. The method for ambient light detection, proximity sensing, and ambient light charging applied to the panel according claim 1, wherein the ambient light detection captures information of ambient light intensity through a whole area, sub-regions, subpixels or color units.

9. The method for ambient light detection, proximity sensing, and ambient light charging applied to the panel according claim 1, wherein the proximity sensing further features infrared LED lighting control for ToF (Time of Flight) or 3D sensing detection.

10. The method for ambient light detection, proximity sensing, and ambient light charging applied to the panel according claim 1, wherein the ambient light charging absorbs ambient light energy through a whole area, sub-regions, sub-pixels or color units.

11. The method for ambient light detection, proximity sensing, and ambient light charging applied to the panel according claim 1, wherein the ambient light detection and ambient light charging is achieved by a photovoltaic mode.

12. The method for ambient light detection, proximity sensing, and ambient light charging applied to the panel according claim 1, wherein the display panel comprises a solar cell, the solar cell is electrically connected to each of the PN junction units of the display panel, and each of the PN junction units comprises the functions of charging, storing power, and displaying.

\* \* \* \* \*